3,147,268
4-AMINO DERIVATIVES OF METHYLPIPERIDINES
Robert I. Meltzer, Rockaway, and Wilson B. Lutz, Florham Park, N.J., assignors to Warner-Lambert Pharmaceutical Company, Morris Plains, N.J., a corporation of Delaware
No Drawing. Filed Sept. 25, 1961, Ser. No. 140,218
2 Claims. (Cl. 260—293.4)

The present invention relates to new and novel piperidine derivatives having the formula

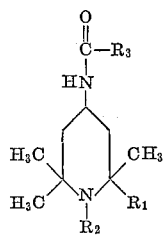

wherein $R_1$ is hydrogen or methyl, $R_2$ is hydrogen or lower alkyl and $R_3$ is

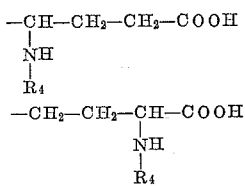

or

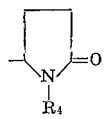

where $R_4$ is a tosyl radical. This invention also relates to the pharmaceutically acceptable non-toxic acid addition and quaternary ammonium salts of the above compounds.

The compounds of our invention having the above formula have been found to possess significant pharmacological activity in lowering blood pressure. Moreover, they are valuable intermediates in the production of other piperidine derivatives.

We have now found that those compounds of our invention having the formula

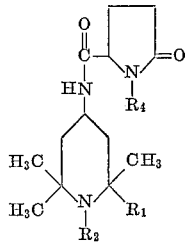

wherein $R_1$, $R_2$ and $R_4$ are as described hereinabove may be prepared by the reaction of known 4-aminopiperidine starting materials of the formula

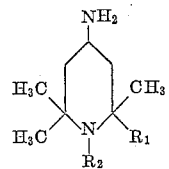

with N-tosyl-L-pyrrolid-5-one-2-carbonyl chloride. The treatment of the product of this reaction with an alkaline earth hydroxide, such as barium hydroxide, results in the opening of the pyrrolidone ring to form those compounds of our invention having the formula

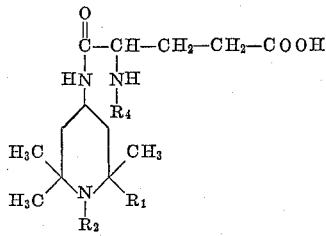

We have also found that those compounds of our invention having the formula

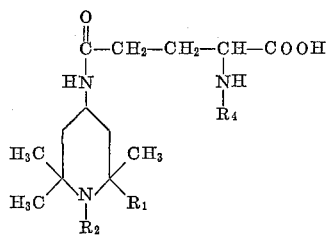

may be prepared by the reaction of 4-aminopiperidine starting materials having the formula

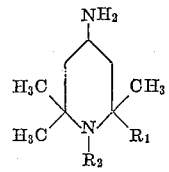

with N-tosyl-L-pyrrolid-5-one-2-carboxylic acid.

The compounds of our invention may be readily converted by conventional procedures into their pharmaceutically acceptable non-toxic acid addition and quaternary ammonium salts. Useful acid addition salts are those of such acids as maleic, oxalic, citric, acetic, methylsulfonic, p-toluenesulfonic, sulfonic, sulfuric, phosphoric, cinnamic, hydrochloric, hydrobromic and the like. Useful quaternaries are formed with such reactive halides or esters as methyl iodide, n-hexyl bromide, benzyl chloride, methyl sulfate, ethyl sulfate, methyl p-toluenesulfonate and the like.

For therapeutic use, our new and novel compounds, either as the free base or in the form of a salt, may be formulated with a conventional pharmaceutical carrier to form tablets, capsules, elixirs, solutions, suspensions, suppositories and the like.

The following examples are included in order to further illustrate our invention:

EXAMPLE 1

*N-(1,2,2,6,6-Pentamethyl-4-Piperidinyl)-1-Tosyl-5-Pyrrolidone-2-Caroxamide*

N-tosyl-L-pyrrolid-5-one-2-carbonyl chloride (3.0 g., 0.01 mole) in 10 ml. of chloroform is cooled in an ice bath and treated dropwise with 1,2,2,6,6-pentamethyl-4-aminopiperidine (1.70 g., 0.01 mole). After forty minutes at room temperature, 10 ml. of ethyl acetate are added and the mixture poured into 50 ml. of ether. The precipitated hydrochloride is collected, and washed with ether and ligroin. When dry it weighs 4.6 g., M.P. 198–215°. The filtrate deposits an additional 500 m.g., M.P. 201–214° dec. The two salt fractions are dissolved in 50 ml. of water, basified with 5% sodium bicarbonate and the product extracted into 150 ml. of ether. The solvent is then removed on the steam bath and the residue crystallized from 25 ml. of benzene. The product weighs 3.15 g. (73%) and melts at 198–203°. Two additional recrystallizations from benzene gives analytically pure material, M.P. 208–209°, $[\alpha]_D^{26.5}$ −75.7°, c.=1 in 1% acetic acid.

*Analysis.*—Calcd.: C, 60.66; H, 7.64; N, 9.65. Found: C, 60.67; H, 7.76; N, 9.89.

EXAMPLE 2

*1,2,2,6,6-Pentamethyl-4-(N-Tosyl-L-α-Glutamylamino)Piperidine*

A quantity of 14.6 g. of N-(1,2,2,6,6-pentamethyl-4-piperidinyl)-1-tosyl-5-pyrrolidone - 2 - carboxamide is dissolved in 50 ml. methanol and the mixture is stirred vigorously while a solution of 11.1 g. (0.065 mole) of barium hydroxide in a minimum amount of water is quickly added. A thick white precipitate separates immediately. After ten minutes at room temperature the solid is dissolved by the addition of 350 ml. of water. After an additional fifteen minutes, carbon dioxide is bubbled through the solution until the precipitation of barium carbonate appears to be complete. The pH is then adjusted to 8 with ammonium hydroxide and the barium carbonate filtered. Evaporation of the solvent on a rotating evaporator at 15 mm. gives a glassy residue which is dissolved in 220 ml. of acetone. The crystals which separated on standing overnight weighed 13.4 g. (90.5%). After recrystallization from methanol-acetone the melting point is 200–215° dec., $[\alpha]_D^{26.5}$ +20.6°, c.=1 in water.

*Analysis.*—Calcd.: C, 58.25; H, 7.78; N, 9.26. Found: C, 58.28; H, 8.02; N, 9.10.

EXAMPLE 3

*1,2,2,6,6-Pentamethyl-4-(N-Tosyl-L-γ-Glutamylamino)Piperidine*

A quantity of 10 g. (0.033 mole) N-tosyl-L-pyrrolid-5-one-2-carboxylic acid monohydrate and 6.1 g. (0.036 mole) of 1,2,2,6,6 - pentamethyl - 4 - aminopiperidine are heated on a steam bath for one hour with intermittent stirring of the resulting paste. This paste is then boiled with 50 ml. of acetonitrile to give 14.9 g. (100%) of white crystals, M.P. 191–196°. Recrystallization from 200 ml. of acetonitrile gives 7.45 g. (50%) of analytically pure product, M.P. 192–193°, $[\alpha]_D^{27}$ −30.2°, c.=1 in water.

*Analysis.*—Calcd.: C, 58.25; H, 7.78; N, 9.26. Found: C, 58.38; H, 7.64; N, 8.99.

In the foregoing examples, all temperatures are given in degrees centigrade.

It is understood that the foregoing detailed description is given merely by way of illustration and that many variations may be made therein without departing from the spirit of our invention.

Having described our invention what we desire to secure by Letters Patent is:

1. A member selected from the group consisting of compounds of the formula

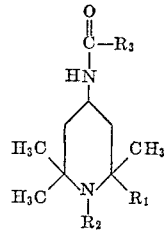

wherein $R_1$ is a member selected from the group consisting of hydrogen and methyl, $R_2$ is a member selected from the group consisting of hydrogen and lower alkyl and $R_3$ is

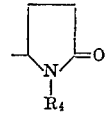

in which $R_4$ is tosyl, and the non-toxic pharmaceutically acceptable acid addition and quaternary ammonium salts thereof with a compound selected from the group consisting of methyl, iodide, ethyl bromide, n-hexyl bromide, benzyl chloride, methyl sulfate, ethyl sulfate and methyl-p-toluene sulfonate.

2. N - (1,2,2,6,6 - pentamethyl - 4 - piperidinyl) - 1-tosyl-5-pyrrolidone-2-carboxamide.

No references cited.